United States Patent
Numata

[11] 4,285,585
[45] Aug. 25, 1981

[54] EXPOSURE CONTROL COMPENSATING MEANS FOR CLOSE-UP PHOTOGRAPHY

[75] Inventor: Saburo Numata, Urawa, Japan

[73] Assignee: Fuji Photo Optical Co., Ltd., Japan

[21] Appl. No.: 35,449

[22] Filed: May 3, 1979

[30] Foreign Application Priority Data

May 4, 1978 [JP] Japan .................................. 53-53319

[51] Int. Cl.³ .......................... G03B 15/05; G03B 7/20
[52] U.S. Cl. .......................................... 354/33; 354/50; 354/145; 354/196
[58] Field of Search ....................... 354/27, 32, 33, 34, 354/35, 60 R, 139, 145, 149, 50, 51, 60 R, 46, 195, 196, 198, 286; 352/140; 315/241 P

[56] References Cited
U.S. PATENT DOCUMENTS

| | | | |
|---|---|---|---|
| 3,738,240 | 6/1973 | Mitani | 354/33 |
| 3,836,920 | 9/1974 | Uchiyama et al. | 354/27 |

FOREIGN PATENT DOCUMENTS 2166179  8/1973  Fed. Rep. of Germany ............. 354/32

*Primary Examiner*—L. T. Hix
*Assistant Examiner*—William B. Perkey
*Attorney, Agent, or Firm*—Eyre, Mann, Lucas & Just

[57] ABSTRACT

In an automatic exposure control camera in which exposure is controlled based on an output of an arithmetic unit, the F-value information of the taking lens of the camera in the arithmetic unit is compensated by use of a distance information from a distance detector, and the exposure is controlled based on the compensated F-value, whereby the exposure is compensated in close-up photography.

5 Claims, 2 Drawing Figures

EXPOSURE CONTROL COMPENSATING MEANS FOR CLOSE-UP PHOTOGRAPHY

BACKGROUND OF THE INVENTION

1. Field of the Invention

This invention relates to means for compensating the exposure control in a close-up photography, and more specifically to means for compensating the exposure control for close-up photography in an automatic exposure control system of a camera in which exposure is controlled in accordance with an output of an arithmetic unit of an exposure control circuit.

2. Description of the Prior Art

In case of close-up photography, the exposure is apt to be short. Therefore, when a photographer takes a close-up photography, he usually makes compensation for the exposure based on his experience or with reference to a compensation table prepared in advance. Since the compensation is conducted manually, it often happens that the compensation is not properly made. Sometimes, the photographer forgets compensating and sometimes the compensation is improper.

SUMMARY OF THE INVENTION

In view of the above-mentioned state of the art, it is the primary object of this invention to provide an automatic exposure compensating means for close-up photography so that the exposure is always properly compensated when a close-up photograph is taken.

The automatic exposure compensating means for close-up photography in accordance with this invention is only applicable to a camera provided with an exposure control circuit including an arithmetic unit in which various exposure factors are calculated to output an exposure control signal. In accordance with this invention, the signal indicative of F-value of the lens input into the arithmetic unit is compensated by a close-up photography signal from a distance detecting means, and the arithmetic unit outputs an exposure control signal based on the compensated F-value. The exposure control is conducted by controlling, for instance, aperture size of a diaphragm aperture, shutter speed or flashing time of an electronic flash light.

DESCRIPTION OF THE PREFERRED EMBODIMENTS

Now the invention will be described in detail with reference to the preferred embodiments thereof.

There are relations of $F=f/a$ and $FD=l'/a$ between the focal length (f) of the taking lens of a camera, the distance (l') between the lens and the image plane, the aperture size (a) of the lens, the full aperture size (F) of the lens, and the effective F-value (FD) of the lens in case of close-up photography. Therefore, the following formula can be obtained:

$$f/l' = F/FD$$

The effective F-value is therefore, $$FD = F(l')/f \quad (1)$$

Since $1/l + 1/l' = 1/f$, where l is the distance between the object and the taking lens, $1/l' = 1/f - 1/l = (l-f)/fl$. Therefore, $$l'/f = l/(l-f) \quad (2)$$

From the formulae (1) and (2), the effective F-value FD can be represented as $$FD = F \frac{l}{l-f} \quad (3)$$

Since the values F and f are known in advance for a camera, the effective F-value (FD) is determined solely by the distance (l) of the object from the taking lens of the camera. In this invention, the operation of the formula (3) is conducted by a compensating arithmetic unit shown by 1 in FIG. 1 or 5 in FIG. 2.

Figure 1:
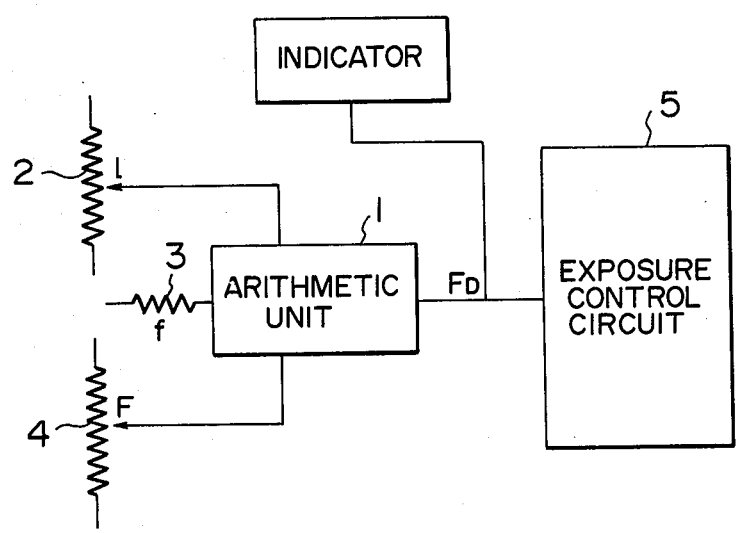
FIG. 1 is a block diagram showing an embodiment of the exposure control compensating means in accordance with the present invention.

Referring to FIG. 1 which shows an embodiment of the present invention in which an exposure factor like aperture size or shutter speed is compensated, a compensating arithmetic unit 1 is connected with a distance-voltage converter or a distance detector 2 for outputting distance information (l), a focal length-voltage converter 3 for outputting focal length information (f), and an F-value-voltage converter 4 for outputting F-value information to be provided with the three information inputs. The distance-voltage converter 2 and the F-value-voltage converter 4 are variable resistors which vary the output thereof by rotating a lens barrel for instance. The focal length-voltage converter 3 is a fixed resistor.

The compensating arithmetic unit 1 calculates the FD value based on these three inputs. The output FD thereof in input into an exposure control circuit 5 provided with an arithmetic unit which operates to output a shutter speed information based on the effective F-value FD.

Figure 2:
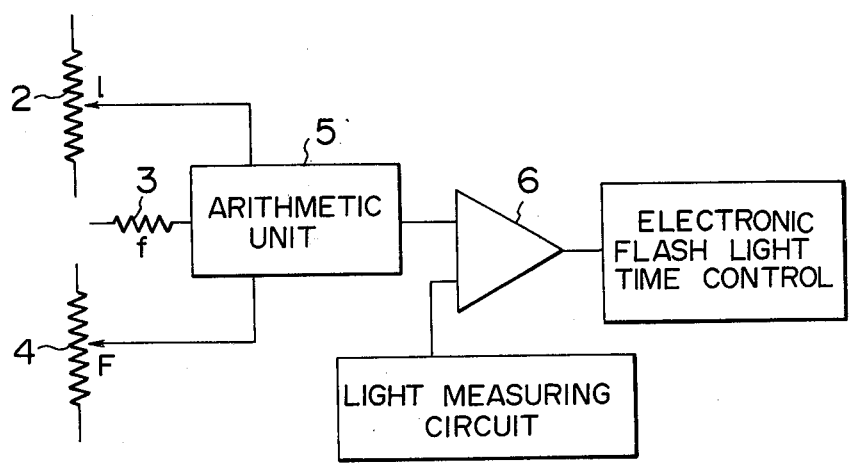
FIG. 2 is a block diagram showing another embodiment of the exposure control compensating means in accordance with the present invention.

FIG. 2 shows another embodiment of the present invention in which flashing time of an electronic flash lamp is controlled based on the output of the arithmetic unit 5. The effective F-value FD output by the arithmetic unit 5 is input into an operating circuit 6 which is connected with a light measuring circuit and gives an output representing an integrated value of the amount of electronic flash light. Thus, the proper amount of flash light to be emitted by the electronic flash light is calculated by the operating circuit 6 and the output of the operating circuit 6 is input into an electronic flash light time control circuit. Since the focal length information (f) is a fixed value, the focal length-voltage converter 4 may be omitted or incorporated into the F-value-voltage converter 4 or in the arithmetic unit 5. This applies also to the embodiment of FIG. 1.

In the above embodiments, the effective F-value FD is calculated and used for compensating the exposure time. However, the full aperture size F may be compensated by use of the close-up photography information and the exposure may be controlled based on the compensated full aperture value F.

I claim:

1. In a camera, exposure control apparatus including means for automatically compensating exposure control for close-up photography in accordance with the formula $$FD = F \cdot \left(\frac{l}{l-f}\right)$$

where
- FD = effective F-value
- F = a preselected F-value
- l = the actual distance from the camera lens to an object to be photographed
- f = the actual focal length of the lens, and wherein the value of $l/(l-f)$ is always greater than 1, said means comprising:
(a) an arithmetic unit;
(b) an F-value input means connected to said arithmetic unit;
(c) distance information input means connected to said arithmetic unit;
(d) a focal length information input means connected to said arithmetic unit;
(e) said arithmetic unit providing an effective F-value exposure control output according to said formula based on said inputs.

2. The apparatus of claim 1 wherein said focal length information input means is a focal length—voltage converter.

3. The apparatus of claim 2 wherein said focal length—voltage converter is a fixed resister.

4. The apparatus of claim 1 further comprising an exposure control circuit for providing shutter speed information according to the effective F-value.

5. The apparatus of claim 1 further comprising means for controlling the flashing time of an electronic flash lamp according to the effective F-value.

* * * * *